(12) United States Patent
Friedersdorf

(10) Patent No.: US 6,881,800 B2
(45) Date of Patent: Apr. 19, 2005

(54) PROCESSES AND APPARATUS FOR CONTINUOUS SOLUTION POLYMERIZATION

(75) Inventor: Chris B. Friedersdorf, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/415,157

(22) PCT Filed: Oct. 17, 2001

(86) PCT No.: PCT/US01/32299

§ 371 (c)(1),
(2), (4) Date: Apr. 24, 2003

(87) PCT Pub. No.: WO02/34795

PCT Pub. Date: May 2, 2002

(65) Prior Publication Data

US 2004/0024146 A1 Feb. 5, 2004

Related U.S. Application Data

(60) Provisional application No. 60/243,192, filed on Oct. 25, 2000.

(51) Int. Cl.[7] ............................. C08F 2/06; B01J 19/00
(52) U.S. Cl. ......................... 526/68; 526/70; 526/918; 526/920; 422/131; 422/132; 422/134
(58) Field of Search ........................... 526/68, 70, 918, 526/920; 422/131, 132, 134

(56) References Cited

U.S. PATENT DOCUMENTS

| | | | |
|---|---|---|---|
| 3,726,843 A | | 4/1973 | Anolick et al. .......... 260/80.78 |
| 3,912,698 A | | 10/1975 | Shurts ..................... 260/80.78 |
| 4,444,922 A | * | 4/1984 | Gutowski et al. ........... 523/339 |
| 5,599,885 A | * | 2/1997 | Kawasaki et al. ............ 526/68 |

FOREIGN PATENT DOCUMENTS

| | | | | |
|---|---|---|---|---|
| EP | 0552945 | | 5/1997 | ........... C08F/10/00 |
| WO | WO 92/14766 | * | 9/1992 | |
| WO | 92/14766 | | 9/1992 | ............. C08F/6/02 |
| WO | 94/00500 | | 1/1994 | ........... C08F/10/00 |
| WO | 98/02471 | | 1/1998 | ......... C08F/210/18 |

OTHER PUBLICATIONS

"A Low–Energy Solvent Separation Method," T.G. Gutowski, et al., *Polymer Engineering*, Mar. 1983, pp. 230–237.

"Critical Dynamics and Phase Separation Kinetics, etc.," Hajime Tanaka, *Journal of Chemical Physics*, vol. 100(7), pp. 5323–5337 (1994).

"A Lower Critical Solution Temperature Behavior of Ethylene Propylene Copolymers in Multicomponent Solvents," C.A. Irani, et al., *Journal of Applied Polymer Science*, vol. 31, pp. 1879–1899 (1986).

"Separating Polymer Solutions With Supercritical Fluids," Mark A. McHugh, et al., *Macromolecules*, vol. 18, pp. 674–680 (1985).

"Short Chain Branching Effect on the Cloud–Point Pressures of Ethylene Copolymers in Subcritical and Supercritical Propane," S.J. Han, et al., *Macromolecules*, vol. 31, pp. 2533–2538 (1998).

* cited by examiner

Primary Examiner—Roberto Rabago

(57) ABSTRACT

The invention relates to processes and plants for continuous solution polymerization. Such plant and processes include a pressure source, a polymerization reactor, downstream of said pressure source, pressure let-down device, downstream of said polymerization reactor, and a separator, downstream of said pressure let-down device, wherein said pressure source is sufficient to provide pressure to said reaction mixture during operation of said process plant to produce a single-phase liquid reaction mixture in said reactor and a two-phase liquid-liquid reaction mixture in said separator in the absence of an additional pressure source between said reactor and said separator.

17 Claims, 3 Drawing Sheets

PROCESSES AND APPARATUS FOR CONTINUOUS SOLUTION POLYMERIZATION

This application is the National Stage of International Application No. PCT/US01/32299, filed Oct. 17, 2001, which claims the benefit under 35 U.S.C. §119(e) of U.S. Provisional Application No. 60/243,192, filed Oct. 25, 2000, the entire disclosure of which is incorporated herein by reference.

FIELD OF INVENTION

The invention relates to processes and apparatus for continuous solution polymerization. The invention relates especially to such processes and apparatus using single site soluble transition metal catalysts, in particular those known as metallocene catalysts. The invention furthermore relates especially to such processes and apparatus that provide for improved control of hydrogen level, and more especially for improving series reactor operation using single site soluble transition metal catalysts.

BACKGROUND OF INVENTION

Continuous solution polymerization processes generally involve the addition of catalyst to a monomer and solvent mixture. The mixture may be back-mixed giving a uniform polymer in an environment with substantially no concentration gradients. WO 94/00500 (Pannell, et al.) describes a solution polymerization using metallocene in a continuous stirred tank reactor, which may be in a series reactor arrangement to make a variety of products.

For the purposes of this patent specification the term "metallocene" is herein defined to contain one or more cyclopentadienyl moiety in combination with a transition metal of the Periodic Table of Elements.

The heat of the polymerization reaction can be absorbed by the polymerization mixture, causing an exotherm. Alternatively, or in addition, the heat of reaction can be removed by a cooling system, by external cooling of the walls of the reactor vessel, or by internally arranged heat exchange surfaces cooled by a heat exchange fluid.

In the course of the polymerization, typically, a predominant amount (over 50 mol %) of the monomer is consumed and the polymer formed is dissolved in the solvent. The higher the concentration of the polymer, the higher the viscosity of the polymerization reaction mixture containing the polymer, solvent, and unreacted components. The mixture passes from the polymerization reactor to a finishing section in which polymer, solvent and unreacted monomer are separated. In the course of finishing, solvent and unreacted monomer are progressively removed from the polymerization mixture until the polymer can be formed into a solid pellet or bale. The separated solvent and monomer can be recycled to the polymerization reactor.

It is well known from extensive literature sources that polymer solutions can undergo phase separation at the lower critical solution temperature, with phase separation being encouraged by higher temperatures and/or by lower pressures. Solvents selection also influences the conditions where phase separation occurs.

The phenomenon of phase separation is firstly a consideration in the selection of the polymerization solvent. Appropriate polymerization monomer conversions, especially of the volatile monomers, temperatures, and pressures have to be selected for given polymer/solvent combination conditions to avoid unwanted phase separation inside the reactor. Solvents such as hexane may require an elevated pressure in excess of 50 bar to avoid two-phase conditions for olefin polymerization; solvents such as octane can maintain homogeneous one-phase conditions at lower pressures.

The phenomenon of phase separation can secondly be exploited after the reaction step to separate volatile solvent and unreacted monomer components on the one hand, and polymer on the other hand. In that case, separation at temperature well above the lower critical solution temperature is encouraged to allow the polymer to form a concentrated phase. Some earlier articles explain the general principles of which we are aware are: "A low-energy Solvent Separation Method," by T. G. Gutowski et al, *Polymer Engineering*; "Solvents" by C. A. Irani et al. in *Journal of Applied Polymer Science* Vol 31, 1879–1899 (1986); "Separating Polymer Solutions with Supercritical Fluids," by Mark A. McHugh et al in *Macromolecules* 1985, 18, 674–680; "Critical dynamics and phase separation kinetics etc," by Hajime Tanaka in *Journal of Chemical Physics* 100 (7) 1 Apr. 1994 p 5323–5337; "Short Chain Branching Effect on the Cloud Point Pressures of Ethylene Copolymers etc.," by S. J. Han et al. in *Macromolecules* 1998, 31, 2533–2538.

U.S. Pat. No. 3,726,843 described a process for making EPDM. Liquid phase separation has also been exploited to remove solvent from the polymerized mixture exiting from the polymerization reactor in Mitsui EP-552945-A (U.S. Pat. No. 5,599,885), which shows a continuous solution polymerization process with a metallocene catalyst. Hydrogen is added in the examples to avoid higher molecular weights at the low operating temperature. The pressure and temperature are raised to permit a subsequent pressure drop, that leads to the formation of separate lean and concentrated phases. Catalyst emerging from the reactor is recycled.

EP-552945-A does not disclose that the polymerization process may be conducted at elevated pressures to provide a wide range of polymers and outputs in the same plant arrangement. EP-552945-A uses an auto-refrigerated reactor in which the solvent is allowed to boil which favors low pressure operation. EP-552945-A does not suggest exploiting the initial elevated pressure in the finishing section.

While the single site, metallocene catalysts have a high activity; that activity is often sustained under conditions in which phase separation would occur at elevated temperatures. Continued polymerization activity during phase separation may influence polymer characteristics undesirably.

The use of single site catalysts is associated with poor solubility in the aliphatic hydrocarbon, saturated, non-polar solvents used for homogeneous solution polymerization. As a result, an aromatic catalyst solvent, such as toluene may have to be used. This in turn can complicate solvent separation to prevent toluene build up in the reactor, and lead to environmental pollution and added maintenance expenditure. EP-552945-A tries to avoid the use of toluene by slurrying the catalyst, comprising alumoxane as activator, in the polymerization solvent.

In some solution processes (see WO 98/02471 Kolthammer) the polymerized mixture is flashed off in two stages, whereby the solvent and unreacted monomer are converted to a vapor phase. Efficient extraction of solvent, etc., requires low vapor pressures and vapor phase compression or condensation followed by pumping for subsequent separation stages. Pumping is used to convey polymer from flash separation stages to a final devolatilizing extruder U.S. Pat. No. 3,912,698 uses a heat exchanger for a liquid recycle stream to permit an increase in reactor capacity while reducing fouling in the context of a multiple flash to remove volatiles.

The use of single site catalysts is also associated with the generation of hydrogen through beta-hydride abstraction. Such hydrogen, when recycled back to reactor feed, can act as a modifier to reduce the molecular weight of the polymer. The amount of hydrogen established in polymerization may have to be increased or decreased depending on the target molecular weight.

In solution plants, solvent selection, operating temperatures, and purification systems have to be designed for a particular operating window for the desired polymerization process. Metallocene catalysts permit a wide variety of polymers to be made in terms of comonomer content, molecular weight, etc. Optimum production performance for a given type of polymer may be obtained with a particular metallocene within a specific operating window. Different types of polymer may then have to be produced in different plant lay-outs. There is, therefore, a need for a plant design that can be used more flexibly for different types of polymers and metallocene catalysts, and which also can be adapted more easily to evolving metallocene catalyst technologies than current designs of solution polymerization plants.

There is also a need for a plant design that permits more extensive molecular weight control through control of the hydrogen levels. There is an special need for such control that is compatible with series reactor operation that permits well separated split-operating conditions between the first and second reactor (one which permits feeding very low levels of hydrogen to one of the two reactors, while feeding large amounts of hydrogen to the other reactor).

There remains a need for an improved continuous solution process and plant which provides one or more of the following benefits: producing polymer economically across a broad range of operating windows including varying polymerization temperatures; producing a broad spectrum of polymers, particularly polymers of widely varying average molecular weights, molecular weight distributions, and/or comonomer contents; permitting the production of polymers having useful molecular weights at high temperatures (above 150° C.); accommodating a broad range of catalyst performance; reducing energy consumption, especially in finishing, and reducing environmental discharge; and reducing or avoiding fouling in the recycle and purification systems while using highly active metallocene type catalysts with unreacted monomer and temperature during separation processes.

It would be particularly useful to provide a process and plant which can adjust the process window to optimize performance for a given polymer type and catalyst, such that metallocene catalyst can be used to perform at a high activity within that window; while at the same time permitting a broad range of optimized performance windows for different polymer types and catalysts. It would also be beneficial to provide a process and plant which could facilitate operating at such high catalyst activities in the same finishing equipment, which can be used in a largely closed system with substantial recycling of all non-polar solvent and monomer components; with minimal contamination and minimal need to eliminate polar impurities contained in such non-polar recycle, however derived (catalyst residue; scavenger, etc), using a simple removal technique, and without using a stripping agent such as water which would contaminate the recycle.

For additional background, see also WO 94/00500 and WO92/14766.

SUMMARY OF INVENTION

The numbers shown in brackets refer to the numbering of items shown in the drawings and intended for illustration and facilitating understanding and are not intended to limit the disclosure to the items illustrated.

The invention relates generally to a process for continuous solution polymerization of a feed (2, 4, 58) of olefinically unsaturated monomers in a hydrocarbon solvent under pressure, having a continuous stirred tank reactor arrangement (8), to which a single site catalyst is supplied, to form a polymer containing polymerization reaction mixture, and downstream thereof a separating means for continuous separation of the solvent (14, 34, 40) and unreacted monomer from the mixture, which separating means (14, 34, 40) includes at least an initial liquid phase separator to separate the polymerization mixture into a lean phase (20) and a concentrated phase (22). The terms "lean" and "concentrated" or "polymer rich" refers to amount of polymer in the solvent. "Lean" indicates that the solvent contains no polymer or such low amounts of polymer so as to not interfere with subsequent recycling.

The catalyst is preferably a bulky ligand transition metal catalyst. The bulky ligand contains a multiplicity of bonded atoms, preferably carbon atoms, forming a group, which may be cyclic with one or more optional hetero-atoms. The bulky ligand may be metallocene-type cyclopentadienyl derivative, which can be mono- or poly-nuclear. One or more bulky ligands may be bonded to the transition metal atom. The bulky ligand is assumed, according to prevailing scientific theory, to remain in position in the course of polymerization to provide a homogenous polymerization effect. Other ligands may be bonded or coordinated to the transition metal, preferably detachable by a cocatalyst or activator, such as a hydrocarbyl or halogen-leaving group. It is assumed that detachment of any such ligand leads to the creation of a coordination site at which the olefin monomer can be inserted into the polymer chain. The transition metal atom is a Group IV, V or VI transition metal of the Periodic Table of Elements. The transition metal atom is preferably a Group IVB atom.

In a first aspect of the invention a high capacity, low viscosity pump (3) raises the pressure of the feed (2, 4, 58) to at least 75 bar and causes the mixture to pass from the reactor (8) through a heating arrangement (12, 16) up to a pressure reducing means (18) upstream of the liquid phase separator (14) through the action of the pump (3) and in the absence of further pumping means between the reactor (8) and the pressure reducing means (18). The term "high capacity, low viscosity pump" refers generally to a pump with a capacity sufficient to pressurize the whole of the feed at a viscosity not affected by the presence of viscvosity increasing dissolved polymer molecules. A suitable pump type is a centrifugal pump.

The heating arrangement may comprise a first heating stage (12) and a second heating stage (16). The first stage (12) is a heat integrating heat exchanger designed to recover heat that would otherwise be lost when the lean phase (20) was cooled in a final cooler (24). The second stage (16) uses any appropriate heat utility of suitable temperature to finish the heating step.

The reactor arrangement may be single reactor or a plurality, prefereably two, reactors arranged in series, or less preferably in parallel.

In this first aspect, a catalyst killer (10) is added downstream of reactor arrangement (8) (in the case of series reactors that means that the killer is added downstream of the last polymerization reactor) and upstream of the heating arrangement (12, 16) and the liquid phase separator to suppress further polymerization of the heated polymerization mixture undergoing separation, the lean phase (20) being passed through a cooling arrangement, which may comprise the heat integrating exchanger (12) and a final cooler (24), and optionally a drier (32) back to the inlet side of the pump (3); the concentrated phase (22) being subjected to additional solvent removal downstream to obtain a solid polymer.

In a second aspect the lean phase (20) is passed in liquid form to a means (26) for removing hydrogen added to or generated during polymerization, which means (26) comprises a means for contacting a stripping vapor with the lean phase in a countercurrent flow arrangement to concentrate the hydrogen in the vapour phase for removal from the lean phase recycle. This aspect may be practiced in processes and plants not employing the features of the first aspect.

Figure 1:
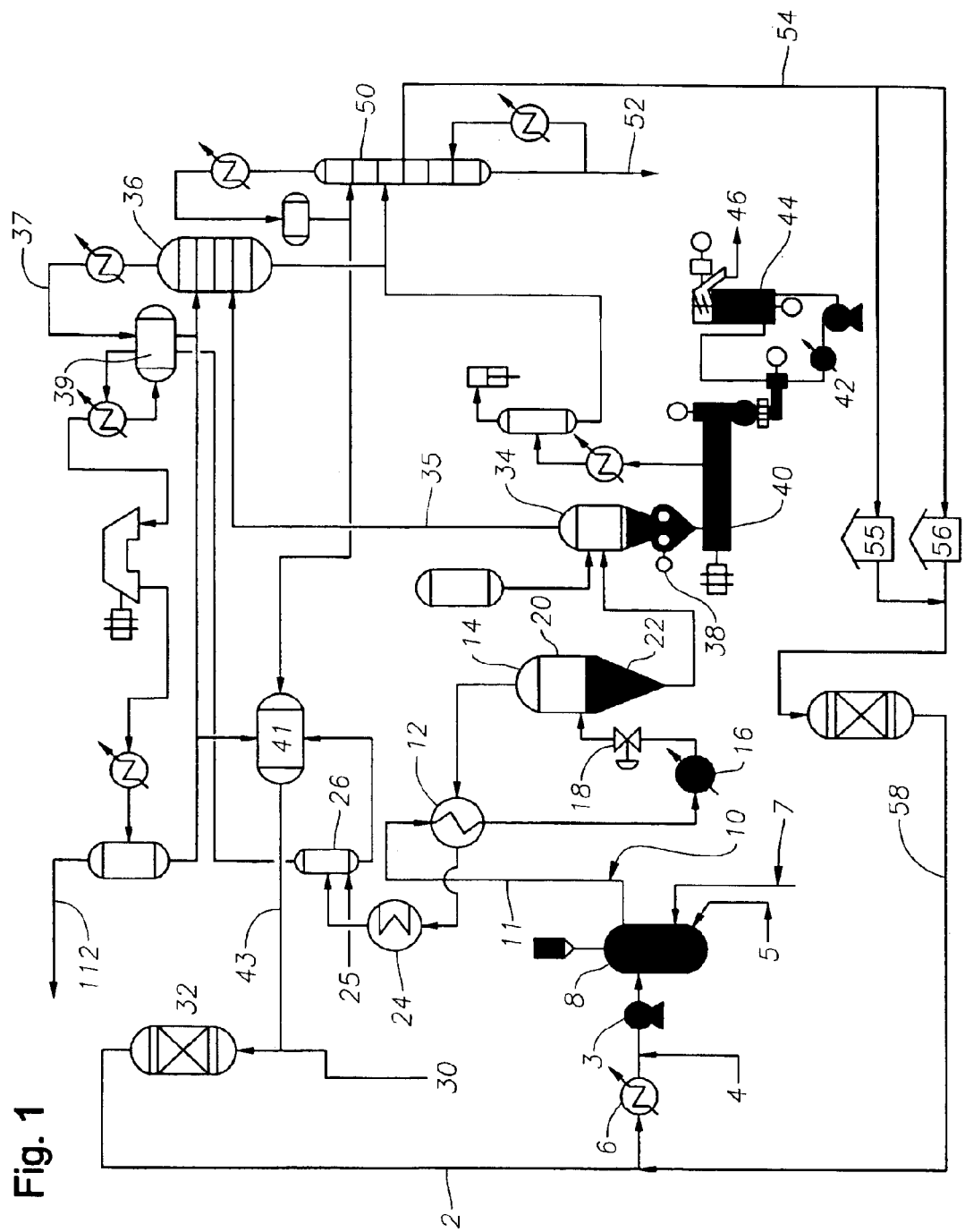
FIG. 1 shows a schematic lay-out of a plant according to the invention and a process flow according to the invention.

The numbers in brackets below again refer to the corresponding features in the drawings included for illustration and ease of understanding. The invention includes other forms of the features indicated by the numbers in brackets in addition to those shown in the drawings as would be apparent to person skilled in the art.

DETAILED DESCRIPTION OF GENERAL AND FIRST ASPECTS

By raising the pressure by the pump (3) to above 75 bar, the formation of two-phase conditions is avoided in the reactor arrangement (8) and heating arrangement (12, 16) under a wide range of temperature and polymerization conditions. Hence a wide variety of metallocene catalysts can be used in the process. Such a wide range of metallocene catalysts can be used to make high and/or low average molecular weight materials under optimized production conditions. Use of a separate pump to boost the pressure of the viscous polymerization mixture between the reactor and the liquid phase separator can be avoided, [such pumps are much more costly than the low viscosity feed pump (3)]. The pressure of the pump (3) also cascades through the process and combines with the absence of vaporization for the initial solvent separating stage to reduce overall pumping needs during finishing. The pressure of the pump (3) advances the viscous polymerization mixture to the pressure reducing means (18) upstream of the liquid phase separator (14) without allowing phase separation prior to the pressure reducing means (18). In a preferred form of the invention, the pressure of the pump (3) additionally advances one or both separated phases to further downstream fractionating systems or purification devices such as high pressure flash separation devices or low pressure flash separating devices.

The integral killer arrangement permits the temperature to be increased without risking further polymerization so facilitating direct recycle, after removal of any surplus killer, of separated solvent and monomer to the inlet side of the pump (3). By the term "direct" it is meant that the lean phase does not need to be fractionated. The plant can be used under a wide variety of conditions to make a wide variety of polymers and is at the same time of simple construction.

Energy consumption per unit polymer produced is low, with simple solvent recovery and energy integration systems [such as heat integrating exchanger (12)], which can be employed to minimize discharges to atmosphere and to recover heat from the effluent on the liquid phase separator (14).

Preferably the liquid phase separator (14) is connected to a low pressure separator (34), arranged downstream, which receives the concentrated phase from the liquid phase separator (14). Preferably a low-pressure separator (34) operates at a pressure sufficient to allow feeding of the vapor phase to the fractionating and purification system without requiring a separate compressor, and said pressure is generally 2 bar guage or more. In order to accommodate production of polymers with a wide range of molecular weights, this pressure in the low pressure separator (34) can be raised to a high level, between 3 and 20 bar, to adjust solution viscosity to facilitate feeding of the concentrated polymer solution to the final devolatizing stage. Thus the volatile phase removed from a concentrated phase is conveyed simply to a fractionating tower (36) as a vapor, arranged downstream of the low pressure separator (34), for purification. In some prior art arrangements where solvents, etc., are drawn off under a low pressure in the vapor phase, the extracted volatiles must be condensed and passed through pumping means for subsequent further separation steps.

Preferably, the process uses a non-polar solvent which does not coordinate or interfere in a meaningful way so as to inhibit the catalytic action of the catalyst system. Preferably the process uses a low boiling, alkane based solvent, optionally mixtures of alkanes, which may be linear or branched, such as those having from 4 to 10 carbon atoms, preferably in the range of 5–7 carbon atoms, optionally in admixture with other alkanes of a higher or lower molecular weight. The polymer may be derived of monomers predominantly comprising mono-olefins such as ethylene or propylene or other higher alpha-olefins having from 4 to 10 carbon atoms. This combination provides a mixture which can be easily separated inside the liquid phase separator.

Considerable energy can be preserved by providing that the polymerization mixture from the reactor (8) is heated to the temperature before reaching the separator (14) successively by an upstream heat integration exchanger (12) and a downstream trim heat exchanger (16) and by providing that the lean phase (20) from the separator (14) is used to supply heat to the upstream one (12) of said heat exchangers.

Working pressures in the process of the invention can be 80 bar or more, 90 bar or more; 95 bar or more and especially 120 bar or more, or even 140 bar or more. The upper pressure limit is not critically constrained but typically can be 200 bar or less, preferably 140 bar or less, or 120 bar or less. The pressure should suffice to keep the reactor solution in a single phase up to the point of the pressure reducing means (18), and to provide the necessary working pressure to convey the fluids through the plant.

The invention in another aspect also relates to a plant adapted to perform the process described above which is suited to operate within the performance envelopes indicated below and with the SSC indicated below. More aspects will be apparent from the claims.

The feed temperature may vary depending on the available exotherm and extent of monomer conversion desired to reach the polymerization temperature. Advantageously the temperature is at least minus 40° C., suitably, at least −20° C., 0° C., 20° C. or 40° C. in certain circumstances. The polymerization temperature is constrained by the molecular weight desired, allowing for the influence of any hydrogen added. In a series reactor process the temperature in the successive reactors can be raised progressively in increments depending on the nature of the polymerization taking place in such reactors. Advantageously, the polymerization temperature for polymers comprising predominantly ethylene derived units is at least 100° C., preferably at least 150° C. or even (for lower molecular weight materials) 200° C. or more. The temperature should not exceed the polymerization decomposition temperature or the temperature at which the catalyst can sustain the polymerization reaction.

Overall the exotherm may lead to a temperature differential between the inlet temp of the polymerization reactor and the outlet of from 50 to 220 or up to 250° C. By feeding at minus 40° C. and allowing the exotherm to raise the temperature to 210° C., a highly efficient process may result for producing lower molecular weight polymers. For higher molecular weight polymers, the temperature rise may need to be constrained via warmer feed and/or lower reactor temperatures to avoid excessive viscosity in the reactor solution that would degrade reactor mixing performance, thereby leading to non-uniform polymers.

Monomer concentration depends on the target polymer type and molecular weight, the associated conversions of monomer to polymer and operating temperature. Advantageously, the monomer partial pressure should be 30% or more of the total partial pressure of volatile components in the polymerization reactors; especially 40% or more, and should preferably not exceed 80%, 70% or especially 60%. The total partial pressure of all components should be less than 100% of the reactor pressure to avoid formation of vapor bubbles. In general, higher monomer partial pressures are preferred to improve the liquid phase separation in the liquid phase separator (14).

In its broadest form, the invention can be performed with any SSC (single sited catalyst). These generally contain a transition metal of Groups 3 to 10 of the Periodic Table; and at least one ancillary ligand that remains bonded to the transition metal during polymerization. Preferably the transition metal is used in a cationic state and stabilized by a cocatalyst or activator. Especially preferred are metallocenes of Group 4 of the Periodic table such as titanium, hafnium or zirconium which are used in polymerization in the $d^0$ mono-valent cationic state and have one or two ancillary ligands as described in more detail hereafter. The important features of such catalysts for coordination polymerization are the ligand capable of abstraction and that ligand into which the ethylene (olefinic) group can be inserted.

The metallocene can be used with a cocatalyst which may be alumoxane preferably methylalumoxane having an average degree of oligomerization of from 4 to 30 as determined by vapor pressure osmometry. Alumoxane may be modified to provide solubility in linear alkanes or be used in a slurry but is generally used from a toluene solution. Such solutions may include unreacted trialkyl aluminum and the alumoxane concentration is generally indicated as mol Al per liter, which figure includes any trialkyl aluminum which has not reacted to form an oligomer. The alumoxane, when used as cocatalyst, is generally used in molar excess, at a mol ratio of 50 or more, preferably 100 or more, and preferably 1000 or less, preferably 500 or less, relative to the transition metal.

The SSC should preferably be selected from among a broad range of available SSC's, to suit the type of polymer being made and the process window associated therewith in such a way that the polymer is produced under the process conditions at an activity of at least 40,000 g polymer per gram SSC (such as a metallocene), preferably at least 60,000 or even in excess of 100,000 g polymer per g SSC. This specification and examples exemplify some of the options. By enabling the different polymers to be produced in different operating windows with an optimized catalyst selection, the SSC and any ancillary catalyst components can be used in small quantities, with optionally also using small amounts of scavengers. The killer can be used in equally small amounts and the various cost-effective methods can then be introduced to allow the non-polar solvent to be recycled and subjected to treatment to remove polar contaminants before re-use in the polymerization reactor(s).

The metallocene may be also be used with a cocatalyst which is a non- or weakly coordinated anion (the term non-coordinating anion as used herein includes weakly coordinated anions. The coordination should be sufficiently weak in any event, as evidenced by the progress of polymerization, to permit the insertion of the unsaturated monomer component.) The non-coordinating anion may be supplied and reacted with the metallocene in any of the manners described in the art.

The precursor for the non-coordinating anion may be used with a metallocene supplied in a reduced valency state. The precursor may undergo a redox reaction. The precursor may be an ion pair of which the precursor cation is neutralized and/or eliminated in some manner. The precursor cation may be an ammonium salt as in EP-277003 and EP-277004. The precursor cation may be a triphenylcarbonium derivative.

The non-coordinating anion can be a halogenated, tetra-aryl-substituted Group 10–14 non-carbon element-based anion, especially those that are have fluorine groups substituted for hydrogen atoms on the aryl groups, or on alkyl substituents on those aryl groups.

The effective Group 10–14 element cocatalyst complexes of the invention are, in a preferable embodiment, derived from an ionic salt, comprising a 4-coordinate Group 10–14 element anionic complex, where $A^-$ can be represented as:

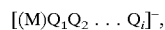

where M is one or more Group 10–14 metalloid or metal, preferably boron or aluminum, and each Q is a ligand effective for providing electronic or steric effects rendering $[(M')Q_1Q_2 \ldots Q_n]^-$ suitable as a non-coordinating anion as that is understood in the art, or a sufficient number of Q are such that $[(M')Q_1Q_2 \ldots Q_n]^-$ as a whole is an effective non-coordinating or weakly coordinating anion. Exemplary Q substituents specifically include fluorinated aryl groups, preferably perfluorinated aryl groups, and include substituted Q groups having substituents additional to the fluorine substitution, such as fluorinated hydrocarbyl groups. Preferred fluorinated aryl groups include phenyl, biphenyl, naphthyl and derivatives thereof.

The non-coordinating anion may be used in approximately equimolar amounts relative to the transition metal component, such as at least 0.25, preferably 0.5, and especially 0.8 and such as no more than 4, preferably 2 and especially 1.5.

Representative metallocene compounds can have the formula:

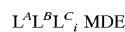

where, $L^A$ is a substituted cyclopentadienyl or hetero-cyclopentadienyl ancillary ligand π-bonded to M; $L^B$ is a member of the class of ancillary ligands defined for $L^A$, or is J, a hetero-atom ancillary ligand σ-bonded to M; the $L^A$ and $L^B$ ligands may be covalently bridged together through a Group 14 element linking group; $L^C{}_i$ is an optional neutral, non-oxidizing ligand having a dative bond to M (i equals 0 to 3); M is a Group 4 or 5 transition metal; and, D and E are independently mono-anionic labile ligands, each having a σ-bond to M, optionally bridged to each other or $L^A$ or $L^B$. The mono-anionic ligands are displaceable by a suitable activator to permit insertion of a polymerizable monomer or macro-monomer can insert for coordination polymerization on the vacant coordination site of the transition metal component.

Representative non-metallocene transition metal compounds usable as SSC's also include tetrabenzyl zirconium, tetra bis(trimethylsiylmethyl) zirconium, oxotris (trimethlsilylmethyl) vanadium, tetrabenzyl hafnium, tetrabenzyl titanium, bis(hexamethyl disilazido)dimethyl titanium, tris(trimethyl silyl methyl) niobium dichloride, and tris(trimethylsilylmethyl) tantalum dichloride.

Additional organometallic transition metal compounds suitable as olefin polymerization catalysts in accordance with the invention will be any of those Group 3–10 that can be converted by ligand abstraction into a catalytically active cation and stabilized in that active electronic state by a non-coordinating or weakly coordinating anion sufficiently labile to be displaced by an olefinically unsaturated monomer such as ethylene.

More preferred are metallocenes which are biscyclopentadienyl derivatives of a Group IV transition metal, preferably zirconium or hafnium. See ExxonMobil WO9941294. These may advantageously be derivatives containing a fluorenyl ligand and a cyclopentadienyl ligand connected by a single carbon and silicon atom. See ExxonMobil WO9945040; and WO9945041 and. Most preferably the Cp ring is unsubstituted and/or the bridge contains alkyl substituents, suitably alkylsilyl substituents to assist in the alkane solubility of the metallocene. See WO0024792 and WO0024793. Other possible metallocenes include those in WO01/58912

Dow EP418044 uses a monocyclopentadienyl compound similar that that EP416815. Similar compounds are described in ExxonMobil EP-420436. Sumitomo WO9703992 shows a catalyst in which a single Cp species and a phenol are linked by a C or Si linkage, such as Me2C(Cp)(3-tBu-5-Me-2-phenoxy)TiCl2. Nova WO200105849 discloses Cp-phosphinimine catalysts, such as (Cp)((tBu)3P=N—)TiCl2.

Other suitable metallocenes may be bisfluorenyl derivatives or unbridged indenyl derivatives which may be substituted at on eor more positions on the fused ruing with moieties which have the effect of increasing the molecular weight and so indirectly permit polymerization at higher temperatures such as described in EP693506 and EP780395.

When using the catalysts of the invention, the total catalyst system will generally additionally comprise one or more organometallic compounds as scavenger. Such compounds as used in this application is meant to include those compounds effective for removing polar impurities from the reaction environment and for increasing catalyst activity. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The impurities, or catalyst poisons include water, oxygen, polar organic compounds, metal impurities, etc. Preferably steps are taken to remove these poisons before introduction of such into the reaction vessel, for example by chemical treatment or careful separation techniques after or during the synthesis or preparation of the various components, but some minor amounts of organometallic compound will still normally be used in the polymerization process itself.

Typically these compounds will be organometallic compounds such as the Group-13 organometallic compounds of U.S. Pat. Nos. 5,153,157, 5,241,025 and WO-A-91/09882, WO-A-94/03506, WO-A-93/14132, and that of WO 95/07941. Exemplary compounds include triethyl aluminum, triisobutyl borane, tri-isobutyl aluminum, tri-n-octyl aluminum, methylalumoxane, and isobutyl alumoxane. Alumoxane also may be used in scavenging amounts with other means of activation, e.g., methylalumoxane and tri-isobutyl-aluminoxane with boron-based activators. The amount of such compounds to be used with catalyst compounds of the inventions is minimized during polymerization reactions to that amount effective to enhance activity (and with that amount necessary for activation of the catalyst compounds if used in a dual role) since excess amounts may act as catalyst poisons.

The process and the plant used in the process are designed as explained above to permit polymerization of a wide variety of polymer types and molecular weights. Generally speaking the polymers are derived from either ethylene or propylene as the dominant (more than 50 mol %) component. Polymers may preferably contain from 5 to 40 mol % of comonomer to vary crystallinity and flexibility. The comonomers may be alpha-olefins (under which term cyclic olefins such as styrene are included) having from 2 to 20 carbon atoms, such as ethylene (in the case of the polymer consisting predominantly of propylene derived units) butene-1, hexene-1, octene-1. Amounts of dienes such as hexadiene, vinyl norbornene, ethylidene norbornene (ENB), norbornadiene etc may be included to promote unsaturation and/or the formation of longer branches themselves made from polymerized monomer derived units.

In the case of plastomer, the polymer which may be produced include the following aspects: Preferably the comonomer is an alpha-olefin having from 3 to 15 carbon atoms, more preferably 4 to 12 carbon atoms and most preferably 4 to 10 carbon atoms. Ethylene can be polymerized with at least two comonomers to form a terpolymer. Monomer is generally polymerized in a proportion of 70.0–99.99, preferably 70–90 and more preferably 80–95 or 90–95 mole % of ethylene with 0.01–30, preferably 3–30 and most preferably 5–20 mole % comonomer. For the purposes of this patent specification the molecular weight distribution of a polymer can be determined with a Waters Gel Permeation Chromatograph equipped with Ultrastyrogel 5 columns and a refractive index detector. The operating temperature of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475. 10. The molecular weight distribution of the plastomers produced in this invention are termed "narrow" that is to say an $M_w/M_n$ less than 3, preferably less than or equal to 2.5. The MI of the polymers of the invention are generally in the range of 0.01 dg/min to 200 dg/min, preferably 0.1 dg/min to 100 dg/min, more preferably 0.2 to 50 dg/min and most preferably less than 10 dg/min. Contemplated densities of component A of the invention are in the range of 0.85 to 0.93 g/cm³, preferably 0.87 to 0.92 g/cm³, more preferably 0.88 to 0.91 g/cm³.

The invention can be especially concerned with copolymerization reactions involving the polymerization of one or more of the monomers, for example alpha-olefin monomers of ethylene, propylene, butene-1, pentene-1 1,4-methylpentene-1, hexene-1, octene-1, decene-1 and cyclic olefins such as styrene. Other monomers can include polar vinyl, dienes, norbornene, acetylene and aldehyde monomers.

In the case of elastomers, the polymer which may be produced include terpolymers of an ethylene-a-olefin-EODE (Ethylene-alpha-Olefin-Diene Elastomer) of high $M_w$, and greater than 0.3 weight % diene content, preferably greater than 2.0 weight % diene content. These polymers may be largely amorphous and have a low or zero heat of fusion. As used herein the term "EODE" encompasses elastomeric polymers comprised of ethylene, an a-olefin, and one or more non-conjugated diene monomers. The non-conjugated diene monomer can be a straight chain, branched chain or cyclic hydrocarbon diene having from 6 to 15 carbon atoms. Examples of suitable non-conjugated dienes are straight chain acyclic dienes such as 1,4-hexadiene and 1,6-octadiene; branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene; single ring alicyclic dienes such as 1,4-cyclohexadiene; and 1,5-cyclododecadiene; and multi-ring alicyclic fused and bridged ring dienes such as tetrahydroindene, methyl tetrahydroindene, dicyclopentadiene; bicyclo-1 5 (2,2,1)-hepta-2,5-diene; alkenyl, alkylidene, cycloalkylidene norbornenes such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

Of the dienes typically used to prepare EPDMs, the particularly preferred dienes are, 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD). The preferred EOD elastomers may contain 20 up to 90 weight % ethylene, more preferably 30 to 85 weight % ethylene, most preferably 35 to 80 weight % ethylene. The alpha-olefin suitable for use in the preparation of elastomers with ethylene and dienes are preferably propylene, 1-butene, 1-pentene, 1-hexene, 1-octene and 1-dodecene. The alpha-olefin is generally incorporated into the EODE polymer at 10 to 80 weight %, more preferably at 20 to 65 weight %. The non-conjugated dienes are generally incorporated into the EODE at 0.5 to 20 to 35 weight %; more preferably at 1 to 15 weight %, and most preferably at 2 to 12 weight %. If desired, more than one diene may be incorporated simultaneously, for example HD and ENB, with total diene incorporation within the limits specified above.

The elastomers may also be devoid of a diene and be a copolymer of two monomer types. Such copolymers may be elastomers of high $M_w$, low crystallinity, and low ash. The copolymers may be ethylene-alpha-olefin copolymers (EPC) of high $M_w$. As used herein the term "EPC" means a copolymer of ethylene and an alpha-olefin, not necessarily propylene, which exhibits the properties of an elastomer. The alpha-olefins suitable for use in the preparation of elastomers with ethylene are preferably $C_3$–$C_{10}$ alpha-olefins. Illustrative non-limiting examples of such a-olefins are propylene, 1-butene, 1-pentene, 1-hexene, 1-octene and 1-dodecene. If desired, more than one alpha-olefin may be incorporated. The EPC elastomers may contain 20 up to 90 weight % ethylene, more preferably 30 to 85 weight % ethylene, and most preferably 35 to 80 weight % ethylene.

In the case of polymers derived predominantly from propylene derived units, the polymers have the following features as a result of the presence of isotactic polypropylene sequences in the chain:

In one embodiment, a copolymer of propylene and at least one comonomer, the comonomer being ethylene or an alpha-olefin. Comonomers include ethylene and linear or branched $C_4$ to $C_{30}$ alpha-olefins, or combinations thereof. Preferred linear alpha-olefins include ethylene and $C_4$ to $C_8$ alpha-olefins, more preferably ethylene, 1-butene, 1-hexene, and 1-octene, even more preferably ethylene or 1-butene. Preferred branched alpha-olefins include 4-methyl-1-pentene, 3-methyl-1-pentene, and 3,5,5-trimethyl-1-hexene. The propylene copolymer of the SPC is preferably a random copolymer, as the term is defined herein below.

The polypropylene copolymer has a crystallinity of from 2% to 65%. Within this range of crystallinity, alternative lower limits of crystallinity can be 5% or 10%, and alternative upper limits of crystallinity can be 50%, 45% or 40%.

The crystallinity of the polypropylene copolymer of the SPC is derived from isotactic (or alternatively syndiotactic) polypropylene sequences in the copolymer. The amount of propylene in the SPC can be from 65% to 95% by weight. Within this range, alternative lower limits of propylene content in the SPC can be 70% or 80% by weight, and alternative upper limits of propylene content can be 92.5%, 90%, or 89% by weight.

The semi-crystalline polypropylene copolymer necessarily has a non-zero heat of fusion, due to the measurable crystallinity. The crystallinity can be calculated from the heat of fusion, using a preferred value of 189 J/g for 100% crystallinity and a linear relationship between heat of fusion and crystallinity; see, B. Wunderlich, "Macromolecular Physics," vol. 3, Academic Press (1980), esp. Chapter 8.4.2.

The polypropylene copolymer of the SPC preferably has a single broad melting transition. Typically, a sample of the polypropylene copolymer will show secondary melting peaks or shoulders adjacent to the principal peak, and this combination is considered together as single melting point, i.e., a single broad melting transition. The highest of these peaks is considered the melting point. The polypropylene copolymer preferably has a melting point of from 25° C. to 110° C. Within this range, alternative lower limits of the melting point can be 30° C. or 35° C., and alternative upper limits of the melting point can be 105° C. or 90° C.

The weight average molecular weight of the polypropylene copolymer can be from 10,000 to 5,000,000 g/mol, preferably 80,000 to 500,000. The MWD ($M_w/M_n$) is preferably above 2. The MWD ($M_w/M_n$) may be less than 40, more preferably less than 5 and most preferably less than 3. In another embodiment, it is preferred that the polypropylene copolymer has a ML (1+4)@125° C. less than 100, more preferably less than 75, even more preferably less than 60, most preferably less than 30.

The polypropylene copolymer of the present invention preferably is a random, crystallizable copolymer having a narrow compositional distribution. The intermolecular composition distribution of the polymer is determined by thermal fractionation in a solvent. A typical solvent is a saturated hydrocarbon such as hexane or heptane. The thermal fractionation procedure is described below. Typically, approximately 75% by weight and more preferably 85% by weight of the polymer is isolated as one or two adjacent, soluble fractions, with the balance of the polymer in immediately preceding or succeeding fractions. Each of these fractions has a composition (wt. % ethylene content) with a difference of no greater than 20% (relative) and more preferably no greater than 10% (relative) from the average weight % ethylene content of the polypropylene copolymer. For purposes of the present disclosure, the polypropylene copolymer is considered to have a "narrow" compositional distribution if it meets the fractionation test outlined above.

The length and distribution of stereoregular propylene sequences in preferred polypropylene copolymers is consistent with substantially random statistical copolymerization. It is well known that sequence length and distribution are related to the copolymerization reactivity ratios. As used herein, the term "substantially random" means a copolymer for which the product of the reactivity ratios is generally 2 or less. In contrast, in stereoblock structures, the average length of PP sequences is greater than that of substantially random copolymers with a similar composition. Prior art polymers with stereoblock structure have a distribution of PP sequences consistent with these "blocky" structures rather than a random, substantially statistical distribution.

The reactivity ratios and sequence distribution of the polymer may be determined by C-13 NMR, which locates the ethylene residues in relation to the neighboring propylene residues. To produce a crystallizable copolymer with the required randomness and narrow composition distribution, it is desirable to use: (1) a single-sited catalyst; and (2) a well-mixed, continuous flow, stirred tank polymerization reactor which allows only a single polymerization environment for substantially all of the polymer chains of preferred polypropylene copolymers.

As general guidance when the molecular weight of the polymers is too low, liquid phase separation in the manner described herein may be hindered or made inefficient as an excessive amount of polymer might then be carried over in the lean phase. The precise boundary depends on solvent composition and polymer composition as well as molecular weight. A rapid pressure let-down, generally greater than 20 bar/second, preferably 30 bar/second or more, more preferably 40 bar/second or more, even more preferably 50 bar/second or more, assists in inducing disengagement of the two phases. This rapid pressure decrease preferably starts from a pressure above the binodal boundary or LSCT and stops at a pressure below the spinodal boundary. The preferred phase separation is by spinodal decomposition and is called pressure induced phase separation (PIPS). Also the liquid phase separator should provide a sufficient residence time to permit the settlement of the lean and concentrated phase at the lower end of the separator.

In the second aspect of the invention, molecular weight control is exercised through control of hydrogen levels, which may be supplementary to control of molecular weight by control of the polymerization temperature. In the second aspect the lean phase is passed in liquid form to a means for removing hydrogen added to or generated during polymerization, which means comprises a means for contacting a stripping vapor with the lean phase in a countercurrent flow arrangement to concentrate the hydrogen in the vapour phase for removal from the lean phase recycle.

The stripping vapor preferably consists of a volatile monomer such as ethylene (25). The means may include a stripping vessel (26) to remove hydrogen from the recovered solvent stream for use as the polymerization feed (2). The stripping vapor advantageously has a low hydrogen content, preferably below 5 mppm. The stripping vapor may be selected to be more volatile than other monomer or solvent components, be substantially devoid of contaminants that are deleterious to the polymerization catalysts, be recoverable in the plant recovery system, and preferably be available at high enough supply pressure for introduction into the stripping vessel (26) without the aid of separate additional compression.

This aspect of the invention is especially applicable to plant lay-outs where reactors are arranged to operate in series and where the upstream reactor is operated under no or low hydrogen conditions to provide a higher molecular weight fraction and where hydrogen is added to a downstream reactor to provide a lower molecular weight fraction.

EXAMPLE

With reference to FIG. 1 the plant is arranged as follows:

Polymerization and Initial Separation of Polymer and Solvent

A feed for polymerization is passed through conduit (2) by a centrifugal pump (3). The feed contains A) hexane as solvent, B) monomer, generally the predominant monomer is ethylene or propylene, and C) comonomer which may be any copolymerizable alpha-olefin, and D) a diene or other polyene or cyclic copolymerizable material. The feed is passed through a chiller or cooler (6) in which the feed is optionally chilled to a low temperature for subsequent adiabatic polymerization in the two continuous stirred tank reactors (8) which are operated in series (for simplicity, only one reactor is depicted in FIG. 1). Activator and metallocene catalyst may be premixed and added at (5) and/or (7) to one or both reactors (8). A scavenger, generally in the form of an alkyl aluminum such as tri-isobutyl aluminum or tri-n-octyl aluminum is next added at (4) to minimize the impact of poisons in the feed and in the reactor on the catalyst activity.

To complement the molecular weight control provided by controlling the polymerization temperature, hydrogen may be added to one or both reactors through conduits (not shown).

The solution, containing polymer, which emerges from the reactors (8) through a conduit (11), is first treated with a catalyst killer, preferably water, added at (10) in a molecular solution in hexane solvent to terminate the polymerization reaction. A heat exchanger (12) is arranged as part of a heat integrating arrangement and heated by a lean phase emerging from an upper layer (20) in a liquid phase separator (14), and provides an initial increase in the temperature of the polymer solution in the conduit (11). A trim heat exchanger (16), operating by using steam, hot oil or other high temperature fluid, further increases the temperature to a level suitable for liquid phase separation. The solution then passes through a let down valve (18) where a pressure drop is created which causes the separation of the polymer solution and settlement into the lean phase (20) and a polymer rich phase (22) below it.

It is important to note that no energy consuming pump is required to provide a pressure increase in the conduit (11) between the reactors (8) and the separator (14) as the polymer containing solution is propelled by the pressure from the pump (3).

Treatment of Lean Phase

The lean phase (20), after being cooled by the heat exchanger (12), aforementioned, is cooled further by a cooling device (24), passed through a surge tank (26) adapted for stripping out the hydrogen and then submitted to in-line chemical analysis at (41) to determine the concentration of monomer and comonomer in the solvent. This cooled lean phase is combined with fresh feed of solvent and monomer (30) to provide the desired concentrations and then passed through a drier (32) which serves to remove any unreacted water used as the catalyst killer or present in the fresh feed supplied or any impurity in the recycled solvent and monomer as will be explained.

Figure 3:
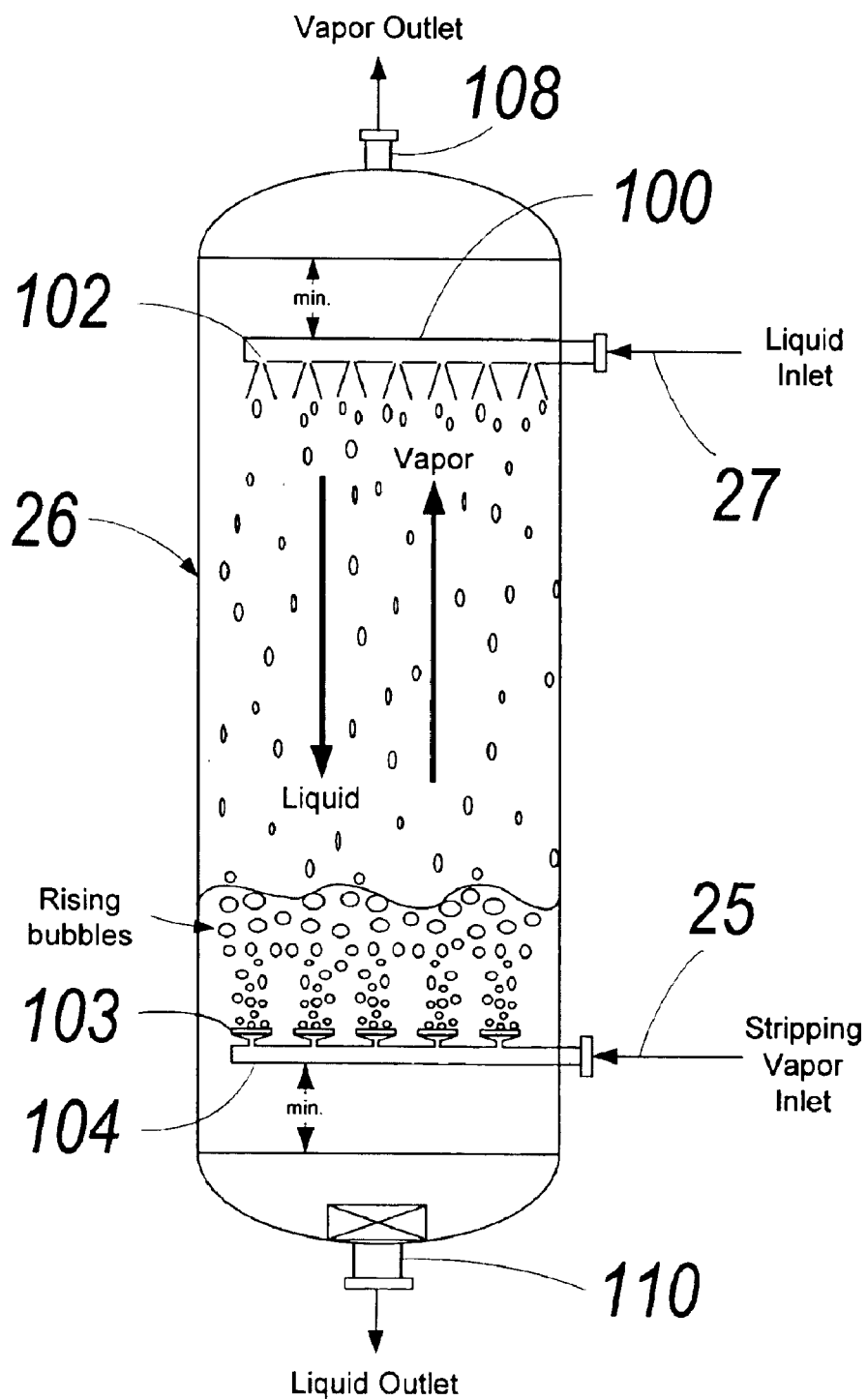
FIG. 3 shows the details of the lay-out of a hydrogen stripping arrangement for the plant of FIG. 1 to provide wide ranging molecular weight control.

The surge tank (26) is arranged in the form a vessel (26) suitable for stripping out hydrogen by means of ethylene as a stripping vapor as is shown in FIG. 3. The lean phase issuing from the cooler (24) is passed through a conduit (27) to a liquid distributor arrangement (100) located inside the vessel (26) in an overhead space in an upper part thereof. The liquid distributor consists of a performated pipe distributor with holes (102) on the bottom. The distributor sprays the lean phase downward inside the vessel (26). Lean phase collects in the lower part of the vessel (26). Part of the ethylene to be added to the feed conduit (2) is supplied as stripping vapor through line (25). The stripping vapor is supplied to a vapor sparger arrangement (104) located inside the vessel (26) submerged in the lean phase collected in the lower part of the vessel. The vapor sparger consists of multiple disks of microporous media (103) arranged on a plurality of rings, arranged concentrically. Vapor bubbles rise from the vapor sparger arrangement (104) through the liquid to the surface into the overhead space. The vapor in the overhead space is passed through conduit (108) for further treatment as described below. The liquid in the lower part is passed through conduit (110) for treatment as will be described below.

In the vessel (26) a countercurrent flow of the liquid feed (27) and the stripping vapor (25) occurs. At the stage where the bubbles of stripping vapor rise through the liquid, the ethylene in the vapor is dissolved in the liquid and hydrogen in the liquid is taken up by the bubbles. Hence the liquid issuing through conduit (110) is enriched by ethylene which can be subjected to polymerization when recycled. A first equilibrium stage can so be approximated. In the vessel (26) vapor space, the rising vapor extracts more hydrogen from the atomized droplets issuing from the nozzles (102) so that a second equilibrium stage can be approximated. The vapor issuing through conduit 108 thus contains a large proportion of the hydrogen contained in the liquid introduced though nozzles 102. Substantially 2 equilibrium stages of separation can be achieved in a single flash vessel. Over 90%, sometimes over 97%, of the hydrogen present in the lean phase can be removed in this way.

The stripping vapor supplied is ethylene, which is a volatile monomer indigenous to the process. Its use minimizes additional operating costs and raw material consumption.

The vapor from conduit (108) is routed to the reflux drum (39) of tower (36). Partly it is processed to recover valuable components, principally volatile monomers such as ethylene and propylene, by fractionating tower (36) and its overhead vapor compression/condensation system (37) for recycling through conduit (43) to the inlet side of the drier (32). The part mainly comprising hydrogen and any other non-condensables may be flared at (112).

A less preferred alternative is for part of the lean phase recycle to be flashed in a single stage flash vessel without the addition of stripping vapor. This, however, only permits limited hydrogen removal and detracts from the benefit of recycling the lean phase in its liquid state without energy intensive evaporation processes.

In single reactor and in series reactor arrangements using metallocene catalysts systems varying amounts of hydrogen may be produced by beta-hydride abstraction, even when no hydrogen is injected into the reactor. The amount may vary with metallocene selected. Its molecular weight reducing effect may be accommodated by appropriate selection of the reactor operating temperature. A substantial amount of this hydrogen may remain unreacted in the reactor effluent stream (11). Reducing the amount of hydrogen recycled in this stream in the manner described above may be is advantageous to permit adjustment of the molecular weight independent of the polymerization operating temperature by removal of the generated hydrogen or by addition of hydrogen from an external source, generally in the feed conduit (2).

In series reactor operation as described herein, the ability to remove hydrogen can be exploited advantageously to widen the molecular weight split between the reactors and to broaden the molecular weight distribution beyond what would otherwise be possible. The feed supplied to the upstream reactor can have a hydrogen content below that which would prevail if hydrogen generated by beta hydride elimination remained in the recycle. Additional extraneous hydrogen can be added to the downstream reactor to provide a hydrogen content above that which would remain if hydrogen from beta hydride elimination were to remain in the recycle.

Effective removal of the hydrogen thus provides a facility which enables the range of bimodal compositions produced in series reactor layouts to be increased. It also permits the selection of a broader range of metallocene catalyst systems regardless of their tendency to generate hydrogen through beta hydride elimination or their sensitivity to the presence of hydrogen in the polymerization mixture.

Treatment of Polymer Rich Phase

The concentrated polymer rich phase is passed to a low-pressure separator (34) where evaporated solvent and monomer are separated from the more concentrated polymer solution emerging from the liquid phase separator (14).

The evaporated solvent and monomer phase is passed through conduit (35) in a vapor phase to the purification tower (36) operating by distillation to separate a light fraction of the highly volatile solvent and unreacted ethylene and propylene on the one hand and heavier less volatile components such as hexane and any toluene used to dissolve catalyst or activator and unreacted diene type comonomers on the other hand. Use of toluene can be reduced under appropriate circumstances by a suitable selection of catalyst components and catalyst preparation conditions such as increases in catalyst solution temperature to increase the solubility of the catalyst components to reach a point where so little toluene is present that no separate process for the removal of the toluene are required.

A gear pump (38) conveys the by now even more concentrated polymer to a vacuum devolatilizing extruder or mixer (40), where again a vapor phase is drawn off for purification, condensed and then pumped to a purification tower (50). A heavy fraction of toluene (52) used as catalyst solvent and diene such as ethylene norbornadiene (ENB) comonomer or octene-1 comonomer are recovered by this purification tower (50). The ENB or octene can be recycled through outlet (54). Alternative heavy comonomers, such as ENB and octene, may thereby be stored in separate storage vessels (55, 56), which facilitates rapid product transitions between different product families (e.g. EP(D)M and EO plastomers, while still enabling eventual recovery of the valuable unreacted comonomers. This capability further enhances the flexibility of this process to produce a wide variety of dissimilar products.

The polymer melt emerging from (40) can then be pelletized in an underwater pelletizer, fed with water chilled at (42), washed and spun dried at (44) to form pellets suitable for bagging or baling at (46).

Polymerization of Differing Polymers

The operation of the plant can be best described with reference to the Table 1 on the following page. This takes as examples polymerization processes to make a low molecular weight plastomer (as described generally above); a higher molecular weight elastomer (as described above) and a high propylene content ethylene copolymer polymerized as described above.

Figure 2:
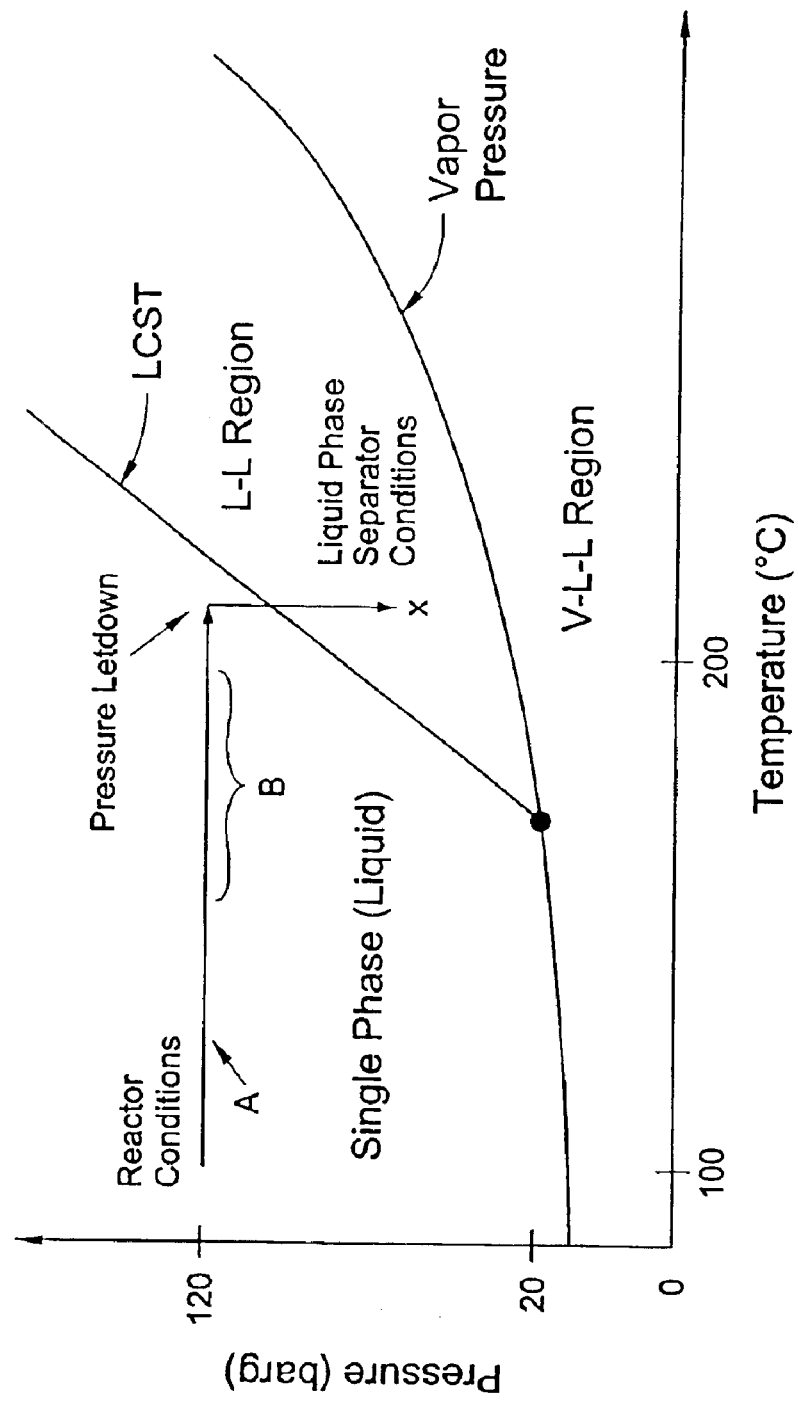
FIG. 2 shows a phase diagram illustrating the operation of a liquid phase separator used in the plant and process according to the invention.

The details of liquid phase separation by passing through a lower critical solution temperature (LCST) boundary is explained with reference to FIG. 2. Polymerization takes place at 100 or 120 bar in the polymerization reactor(s) at the pressure also prevailing upstream of the pressure letdown device at a level as shown by line A. The temperature is maintained and/or raised to a range marked by the bracket shown at B to between 150 and 200 or 220° C. At the prevailing temperature, the pressure is dropped along the arrow to a level marked X. As the temperature is dropped across the letdown valve from 100 bar to 40 bar, the

TABLE 1

Process Conditions of the Plant/Process of the Invention in Varying Operating Modes

| | Feed Into Reactor | Polymerization Inside Reactor | Polymer Solution Upstream Let-Down Valve | Polymer Solution Downstream Let-Down Valve | Polymer Lean Phase | Polymer Rich Phase | Amount of Devolatilized Polymer from Extruder |
|---|---|---|---|---|---|---|---|
| Plastomer | 0 or down to -15° C.; 120 bar total; 50 bar monomer partial pressure. | 150–200° C.; 100 or 120 bar; 15–22 wt % polymer | 220° C.; 40 or 100 bar; 15–22 wt % polymer | 220° C; 40 bar; 15–22 wt % polymer | 220° C.; 40 bar; <0.1 wt % polymer | 220° C.; 40 bar; 30–40 wt % polymer | High |
| Elastomer | 0 or down to -15° C.; 120 bar total; 50 bar monomer partial pressure. | 100° C.; 100 or 120 bar; 8–12 wt % polymer | 220° C.; 100 bar; 8–12 wt % polymer | 220° C.; 40 bar; 8–12 wt % polymer | 220° C.; 40 bar; <0.1 wt % polymer | 220° C.; 40 bar; 30 wt % polymer | Medium |
| Predominant Propylene Content Copolymer | 0 or down to -15° C.; 120 bar total; 50 bar monomer partial pressure. | 50 or 60° C.; 120 bar; 7–8 wt % polymer | 200° C.; 100 bar; 7–8 wt % polymer | 200° C.; 40 bar; 7–8 wt % polymer | 200° C.; 40 bar; <0.1 wt % polymer | 220° C.; 40 bar; 30–35 wt % polymer | Low |

To make plastomer in FIG. 1, the feed temperature is reduced by the chiller (6) to 0° C. Aluminum alkyl is added as scavenger in amounts appropriate to the poison content of the feed. Alternatively the process of WO9722635 (Turner et al.) incorporated herein for US purposes. The pressure is raised by the centrifugal pump to 120 bar. The feed comprising largely solvent and up to 50 bar partial pressure of ethylene and butene or hexene or octene comonomer then enters the first of the two series reactors (8). Catalyst and activator is added to the reactors 8 in amounts to create the desired polymerization temperature which in turn is related to the desired molecular weight. The heat of polymerization increases the temperature to 150 to 200° C. to form a plastomer without the use of hydrogen (although $H_2$ may be used). At the outlet of the second series reactor, the polymer concentration is in the range of from 15–22 wt %. The general conditions may be as described in WO 99/45041 incorporated herein for US purposes.

Water is then supplied at (10) to kill the polymerization reaction which might otherwise continue in the presence of surviving catalyst, unreacted monomer, and elevated temperature.

The heat exchanger (12) raises the temperature initially and then the further heat exchanger (16) causes a further temperature rise to 220° C. A rapid pressure drop results as the polymerization mixture passes through the let-down valve (18) into the liquid phase separator, with the pressure dropping quickly from 100 Bar to 40 bar. The pressure differential between that at the outlet of the pump (3) and the outlet of the let down valve 18 is solely responsible for causing the feed and the polymerization mixture to flow through the reactor (8) and the conduit (11) including the heat exchangers (12) and (16).

polymerization mixture passes from a homogeneous single phase, through the lower critical solution temperature boundary marked LCST, to a two-phase (L—L) region. (i.e. for a given temperature, the pressure starts at a pressure above the highest of the pressure-temperature curves representing the upper critical solution temperature (UCST), the LCST, and the vapor pressure, and the pressure after the let-down for the given temperature is below the pressure-temperature curve representing the spinodal boundary and above the pressure-temperature curve representing the vapor pressure) The pressure drop is sufficiently fast to avoid formation of a continuous polymer and to form a discontinuous solvent/monomer phase. The pressure drop across the region bounded by the LCST (binodal) boundary and the spinodal boundary must be especially rapid to induce phase separation by spinodal decomposition, which leads to rapid phase separation and settling.

Level X is above another phase boundary marked Vapor pressure below which the mixture enters a V-L-L region in which it is part vapor, and part two phase liquid. The pressure at level X at the exit of the separator is sufficiently high so that no vapor is formed.

Inside the separator (14) an upper lean phase is formed with less than 0.1 wt % of polymer and a lower polymer rich phase with 30 to 40 wt % of polymer. The concentration is approximately double to triple that of the polymerization mixture fed to the separator (14). After further removal of solvent and monomer in the low-pressure separator (34) and the extruder (40), polymer can be removed from the plant containing less than 1 wt %, preferably with 0.3 wt % or less, even more preferably <0.1 wt % of volatiles, including water.

If the use of the plant is now compared with the row in Table 1 marked elastomer, it can be seen that although the polymerization temperature is lower than for plastomer, and the polymer concentration emerging from the reactor is lower (its viscosity will be similar to that for plastomers), the same separation process and plant can be used to give an output which is somewhat lower (reflecting the reduced efficiency of the polymerization process at lower temperatures). With two reactors in series, the disclosure of WO 99/45047 (Harrington et al.) may be used, which document is incorporated herein for purposes of US law. Generally speaking, in a series layout it is preferable that the first reactor operates at temperatures between 0 to 110° C. and the second reactor operates between 40 to 140° C. Preferably the first reactor operates at temperatures between 10 to 90° C. and the second reactor operates between 50 to 120° C. Most preferably, the first reactor operates at temperatures between 20 to 70° C. and the second reactor operates between 60 to 110° C. With appropriate control of process conditions and poison levels temperature of this order of magnitude can also be obtained where one reactor only is used or two reactors are used under the same process conditions.

The same can be said about the row in Table 1 marked "Predominant propylene content copolymer" where the temperature is lowered to allow the less reactive propylene monomer to form a sufficiently high molecular weight. The general conditions described in WO 00/01745, which are fully incorporated herein by reference for purposes of US patent practice, can be used. In the runs, the polymerization temperature varied between 28 and 70° C.

While the process windows have been illustrated using prior art disclosures which suggest metallocene selection and the suitable operating window for a given polymer type, to the extent that prior published patent specifications are used to assist in such illustration, it should be kept in mind that these patent specifications did not provide the separation and recycle and purification conditions in a continuous plant with a recycle permitting full exploitation of the product capabilities of high activity metallocene catalyst systems at which the invention is best operated. The invention provides a plant and process which uses the given metallocene catalyst systems disclosed to make the target polymers at high metallocene activity, under a wide range of polymerization conditions and with considerable energy and investment savings.

Advantages

It can be seen that the plant and process illustrated above in a non-limiting manner, permit polymerization and subsequent polymer separation across a broad range of temperatures to yield polymers of widely varying average molecular weights and comonomer contents with catalyst optimized for operation at low or high operating temperatures. A process plant according to the invention is capable of production of plastomers, elastomers, and predominant propylene content copolymers by changing only the substituents of the reaction mixture and the process conditions.

The plant has a low energy consumption because the extent of feed refrigeration and re-pressurizing by pumping can be greatly reduced. Furthermore, no heat of vaporization is required to separate the polymer rich and polymer lean phases in the separator (14), and the heat in the lean phase is efficiently used to increase the temperature of the polymerization mixture entering the separator (14). Little solvent and monomer has to be purged to atmosphere. The evaporated materials recovered from the low pressure separator (34) can be fractionated to allow its direct purification without intervening condensation in a fractionating tower and at the same time assisting the flow of the final polymer/solvent mixture before extrusion into the extruder to minimize pumping requirements. Variation in the pressure of the low-pressure separator (34) may be used to control viscosity of the polymer/solvent mixture into the devolatizer (40), thereby extending the range of polymers that can be processed to those with very high molecular weight.

Widely varying molecular weights and molecular weight distribution can be obtained using the hydrogen stripping arrangement which can be simply integrated and requires no additional extraneous materials or the evaporation of large volumes of recycled lean phase liquid.

All documents cited herein are fully incorporated by reference for all jurisdictions in which such incorporation is permitted and to the extent they are not inconsistent with this specification. All documents to shich priority is claimed are fully incorporated by reference for all jurisdictions in which such incorporation is permitted. Although dependent claims have single dependencies in accordance with U.S. practice, each of the features in any of the dependent claims can be combined with each of the features of one or more of the other dependent claims dependent upon the same independent claim or claims.

What is claimed is:

1. A process for continuous solution polymerization of a feed of olefinically unsaturated monomer in a hydrocarbon solvent under pressure, having a continuous stirred tank reactor arrangement to which a single site catalyst is supplied, to form a polymer containing polymerization reaction mixture, and downstream thereof separating means for continuous separation of the solvent and unreacted monomer from the mixture, which separating means includes at least an initial liquid phase separator to separate the polymerization mixture into a lean phase and a concentrated phase wherein A) a high capacity, low viscosity pump raises the pressure of the feed to at least 75 bar and causes the mixture to pass from the reactor arrangement through a heating stage up to a pressure reducing means upstream of the liquid phase separator through the action of the pump and in the absence of further pumping means between the reactor arrangement and the pressure reducing means; and B) a catalyst killer is added downstream of reactor arrangement and upstream of the liquid phase separator to suppress further polymerization in the separator of the heated polymerization mixture undergoing separation, the lean phase being passed through a cooler, and optionally a drier, back to the inlet side of the pump; the concentrated phase being subjected to additional solvent removal downstream to obtain a solid polymer.

2. The process of claim 1 in which a low pressure separator receiving the concentrated phase from the liquid phase separator operates at a pressure of at least 2 bar gauge at a level sufficient to convey the volatile phase removed from the concentrated phase to a fractionating tower for purification without further means of compression.

3. The process of claim 1 in which the solvent is a low boiling alkane based solvent and the polymer in the polymerization mixture contains at least 50 mol % ethylene or propylene derived units out of the total monomers present.

4. The process of claim 1 in which the polymerization mixture from the reactor arrangement is heated to the temperature for separation in the separator successively by exchangers and the lean phase from the separator is used to supply heat to the upstream one of said heat exchangers.

5. The process of claim 1 in which the lean phase is passed in liquid form to a means for removing hydrogen added to or generated during polymerization, which means comprises a means for contacting a stripping vapor with the lean phase in a countercurrent flow arrangement to concentrate the hydrogen in the vapour phase for removal from the lean phase recycle.

6. A plant for operating a continuous solution polymerization process of a feed of olefinically unsaturated monomer in a hydrocarbon solvent under pressure, which plant contains a continuous stirred tank reactor arrangement to which a single site catalyst may be supplied to form a polymer containing polymerization reaction mixture, and downstream of the reactor arrangement separating means for continuous separation of the solvent and unreacted monomer from the mixture, which separating means includes at least an initial liquid phase separator to separate the polymerization mixture into a concentrated phase and a lean phase, wherein
  A) a high capacity, low viscosity pump is arranged for raising the pressure of the feed to at least 75 bar and a heating arrangement is provided, to thereby cause the mixture to pass from the reactor arrangement through the heating arrangement up to a pressure reducing means upstream of the liquid phase separator (14), no additional pumping means being provided between the reactor and the pressure reducing means; and
  B) means are provided for introducing a catalyst killer downstream of reactor arrangement and upstream of the liquid phase separator to prevent further polymerization in the separator of the heated polymerization mixture undergoing separation, and means are provided for cooling the lean phase, and means are provided for conveying a recycled stream back to the inlet side of the pump.

7. A process for continuous solution polymerization of a feed of olefinically unsaturated monomer in a hydrocarbon solvent under pressure, having a continuous stirred tank reactor arrangement, to which a single site catalyst is supplied, to form a polymer containing polymerization reaction mixture, and downstream thereof separating means for continuous separation of the solvent and unreacted monomer from the mixture, which separating means includes at least an initial liquid phase separator to separate the polymerization mixture into a lean phase and a concentrated phase, wherein
  A) a pump maintains a pressure of at least 75 bar in the polymerization reactor and the temperature in polymerization reactor arrangement is maintained lower than or the same as that in the separating means and a heating arrangement is provided upstream of the separating means to optionally heat the reaction mixture to raise the temperature in the separating means so that, upon a pressure drop via a pressure reducing means upstream of the separator, the mixture passes through the lower critical solution phase boundary regardless of the initial polymerization temperature; and
  B) a catalyst killer is added downstream of reactor arrangement and upstream of the liquid phase separator to suppress further polymerization in the separator of the heated polymerization mixture undergoing separation, the lean phase being passed through a cooler, and optionally a drier, back to the inlet side of the pump;
the concentrated phase being subjected to additional solvent removal downstream to obtain a solid polymer.

8. The process of claim 7 in which the liquid phase separator and a low pressure separator receiving the concentrated phase from the liquid phase separator operate at a pressure of at least 2 bar gauge, at a level sufficient to convey the volatile phase removed from the concentrated phase to a fractionating tower for purification.

9. The process of claim 7 in which the solvent is a low boiling alkane based solvent and the polymer in the polymerization mixture contains at least 50 mol % ethylene or propylene derived units out of the total monomers present.

10. The process of claim 7 in which the polymerization mixture from the reactor arrangement is heated to the temperature for separation in the separator successively by exchangers and the lean phase from the separator is used to supply heat to the upstream one of said heat exchangers.

11. The process of claim 7 in which the lean is passed in liquid form to a means for removing hydrogen added to or generated during polymerization, which means comprises a means for contacting a stripping vapor with the lean phase in a countercurrent flow arrangement to concentrate the hydrogen in the vapour phase for removal from the lean phase recycle.

12. A process plant suitable for continuous circulation of a solution polymerization reaction mixture, said plant comprising:
  a) a pressure source,
  b) a polymerization reactor, downstream of said pressure source,
  c) a heat exchanger, downstream of said polymerization reactor,
  d) a pressure let-down device, downstream of said heat exchanger, said let-down device capable of reducing the pressure of the reaction mixture at a selected temperature pressure-temperature curve to a pressure below the spinodal boundary pressure temperature curve at a rate of at least 20 bar/second, and
  e) a separator, downstream of said pressure let-down device, wherein said pressure source is sufficient to provide pressure to said reaction mixture during operation of said process plant to produce a single-phase liquid reaction mixture in said reactor and a two-phase liquid-liquid reaction mixture in said separator in the absence of an additional pressure between said reactor and said separator.

13. The process plant of claim 12 wherein said plant is capable of production of plastomers, elastomers, or predominant propylene content copolymers by changing only the substituents of the reaction mixture and the process conditions.

14. A process for continuous solution polymerization of a feed of olefinically unsaturated monomer in hydrocarbon solvent under pressure, having a continuous stirred tank reactor arrangement, to which a single site catalyst as supplied, to form a polymer containing polymerization reaction mixture, and downstream thereof separating means for continuous separation of the solvent and unreacted monomer from the mixture, which separating means includes at least an initial liquid phase separator to separate the polymerization mixture into a lean phase for passing through a recycle back to the reactor arrangement and a concentrated phase, wherein the lean phase is passed in liquid form to a means for removing hydrogen added or generated during polymerization, which means comprises a for contacting a stripping vapor with the lean phase in a countercurrent flow arrangement to concentrate the hydrogen in the vapour phase for removal from the lean phase recycle.

15. The process of claim 14 wherein the stripping vapor comprises ethylene for use in subsequent polymerization.

16. The process of claim 14 wherein a pair of reactors are arranged in series and hydrogen is added to the downstream reactor to produce a lower molecular weight fraction.

17. A plant for continuous solution polymerization of a feed of olefinically unsaturated monomer in a hydrocarbon solvent under pressure, having a continuous stirred tank reactor arrangement, with inlets for feed and for a single sited catalyst components, to form a polymer containing polymerization reaction mixture, and downstream thereof separating means for continuous separation a the solvent and unreacted monomer from the mixture, which separating means includes at least an initial liquid phase separator to separate the polymerization mixture into a lean phase for passing through a recycle back to the reactor arrangement and a concentrated phase, a conduit being provided for passing the lean phase in liquid form to a stripping arrangement for removing hydrogen added to or generated during polymerization, which stripping arrangement comprise a means for contacting a stripping for with the lean phase in a countercurrent flow arrangement to concentrate the hydrogen in the vapour phase for removal from the lean phase recycle.

* * * * *